US009262770B2

(12) United States Patent
Yu et al.

(10) Patent No.: US 9,262,770 B2
(45) Date of Patent: *Feb. 16, 2016

(54) CORRELATING WEB PAGE VISITS AND CONVERSIONS WITH EXTERNAL REFERENCES

(71) Applicant: BrightEdge Technologies, Inc., San Mateo, CA (US)

(72) Inventors: Jimmy Yu, Foster City, CA (US); Lemuel S. Park, Cerritos, CA (US); Rolland Yip, Foster City, CA (US)

(73) Assignee: BrightEdge Technologies, Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/199,823

(22) Filed: Mar. 6, 2014

(65) Prior Publication Data

US 2014/0188598 A1    Jul. 3, 2014

Related U.S. Application Data

(63) Continuation of application No. 12/574,069, filed on Oct. 6, 2009, now Pat. No. 8,671,089.

(51) Int. Cl.
*G06F 17/30* (2006.01)
*G06Q 30/02* (2012.01)
*G06Q 30/06* (2012.01)

(52) U.S. Cl.
CPC ............ *G06Q 30/0246* (2013.01); *G06Q 30/02* (2013.01); *G06Q 30/0601* (2013.01)

(58) Field of Classification Search
USPC ................................................. 707/706, 748
See application file for complete search history.

(56) References Cited

U.S. PATENT DOCUMENTS 6,401,075 B1    6/2002  Mason
6,601,100 B2    7/2003  Lee
(Continued)

FOREIGN PATENT DOCUMENTS

CA    2600910    3/2008
CN    1902654 A    1/2007
(Continued)

OTHER PUBLICATIONS

European Patent Office Search Report and Written Opinion for International Application No. 10 82 2418, Oct. 6, 2014.
(Continued)

*Primary Examiner* — Kim Nguyen
(74) *Attorney, Agent, or Firm* — Baker Botts L.L.P.

(57) ABSTRACT

Particular embodiments comprise a method for estimating the value of an organic marketing campaign. A computing device receives an identification of one or more entry pages associated with a website, as well as one or more keywords related to the entry pages. The computing device may determine conversion data, wherein the conversion data is based on traffic information identifying visits to at least one of the entry pages, and wherein the visits comprise organic referrals from a search engine. Using the keywords, the computing device may retrieve organic search results from the search engine, and then analyze the organic search results to determine rank positions of the entry pages. Finally, the computing device may identify a correlation between the rank positions of the entry pages, the conversion data, and the keywords.

20 Claims, 7 Drawing Sheets

(56) References Cited

U.S. PATENT DOCUMENTS

| | | | |
|---|---|---|---|
| 6,810,356 B1 | 10/2004 | Garcia-Franco | |
| 6,925,442 B1 | 8/2005 | Shapira | |
| 6,983,282 B2 | 1/2006 | Stern | |
| 7,043,450 B2 | 5/2006 | Vélez | |
| 7,185,085 B2 | 2/2007 | Bean | |
| 7,206,838 B2 | 4/2007 | Boyd | |
| 7,225,246 B2 | 5/2007 | Shapira | |
| 7,343,412 B1 | 3/2008 | Zimowski | |
| 7,617,193 B2 | 11/2009 | Bitan | |
| 7,877,392 B2 | 1/2011 | Grieselhuber | |
| 7,899,818 B2 | 3/2011 | Stonehocker | |
| 8,041,596 B2 | 10/2011 | Graham | |
| 8,046,357 B2* | 10/2011 | Gulli et al. | 707/726 |
| 8,190,594 B2 | 5/2012 | Park | |
| 8,271,473 B2 | 9/2012 | Berg | |
| 8,306,966 B2 | 11/2012 | Liu | |
| 8,312,022 B2 | 11/2012 | Wilde | |
| 8,316,392 B2 | 11/2012 | Ahanger | |
| 8,341,047 B1 | 12/2012 | Furney | |
| 8,364,529 B1 | 1/2013 | Zwicky | |
| 8,386,321 B2 | 2/2013 | Grant | |
| 8,396,742 B1 | 3/2013 | Blume | |
| 8,417,569 B2 | 4/2013 | Gross | |
| 8,447,751 B2 | 5/2013 | Stouffer | |
| 8,473,495 B2 | 6/2013 | Grieselhuber | |
| 8,515,937 B1 | 8/2013 | Sun | |
| 8,554,775 B2 | 10/2013 | Kon | |
| 8,577,863 B2 | 11/2013 | Yu | |
| 8,620,892 B2 | 12/2013 | Park | |
| 8,671,089 B2 | 3/2014 | Yu | |
| 8,676,798 B1 | 3/2014 | Datta | |
| 8,700,618 B2 | 4/2014 | Evans | |
| 8,706,548 B1 | 4/2014 | Blume | |
| 2002/0032608 A1 | 3/2002 | Kanter | |
| 2002/0073199 A1 | 6/2002 | Levine | |
| 2002/0082901 A1 | 6/2002 | Dunning | |
| 2002/0083188 A1 | 6/2002 | Hericy | |
| 2002/0112048 A1 | 8/2002 | Gruyer | |
| 2002/0154163 A1 | 10/2002 | Melchner | |
| 2003/0014519 A1 | 1/2003 | Bowers | |
| 2003/0046389 A1 | 3/2003 | Thieme | |
| 2004/0059625 A1 | 3/2004 | Schrader | |
| 2006/0167749 A1 | 7/2006 | Pitkow | |
| 2006/0173822 A1 | 8/2006 | Watson | |
| 2006/0224583 A1 | 10/2006 | Fikes | |
| 2006/0253345 A1 | 11/2006 | Heber | |
| 2007/0027754 A1 | 2/2007 | Collins | |
| 2007/0038608 A1 | 2/2007 | Chen | |
| 2007/0067217 A1 | 3/2007 | Schachter | |
| 2007/0067331 A1 | 3/2007 | Schachter | |
| 2007/0112959 A1 | 5/2007 | Bean | |
| 2007/0156621 A1 | 7/2007 | Wright | |
| 2007/0203789 A1 | 8/2007 | Jain | |
| 2007/0233566 A1 | 10/2007 | Zlotin | |
| 2007/0255754 A1 | 11/2007 | Gheel | |
| 2007/0288454 A1 | 12/2007 | Bolivar | |
| 2007/0288514 A1 | 12/2007 | Reitter | |
| 2008/0010142 A1 | 1/2008 | O'Brien | |
| 2008/0046218 A1 | 2/2008 | Dontcheva | |
| 2008/0046281 A1 | 2/2008 | Teicher | |
| 2008/0052278 A1 | 2/2008 | Zlotin | |
| 2008/0071767 A1 | 3/2008 | Grieselhuber | |
| 2008/0104113 A1 | 5/2008 | Wong | |
| 2008/0109318 A1 | 5/2008 | Szmanda | |
| 2008/0133500 A1 | 6/2008 | Edwards | |
| 2008/0162403 A1 | 7/2008 | Sundaresan | |
| 2008/0162699 A1* | 7/2008 | Gaffney | 709/226 |
| 2008/0184129 A1 | 7/2008 | Cancel | |
| 2009/0248677 A1 | 10/2009 | Grynberg | |
| 2009/0307056 A1 | 12/2009 | Park | |
| 2009/0319365 A1 | 12/2009 | Waggoner | |
| 2009/0327304 A1* | 12/2009 | Agarwal et al. | 707/10 |
| 2010/0121707 A1 | 5/2010 | Goeldi | |
| 2010/0217647 A1 | 8/2010 | Jacobs | |
| 2010/0241510 A1* | 9/2010 | Zhang | 705/14.45 |
| 2011/0145064 A1* | 6/2011 | Anderson et al. | 705/14.53 |
| 2011/0213822 A1* | 9/2011 | Yavilevich | 709/202 |
| 2011/0219295 A1 | 9/2011 | Adams | |
| 2011/0320461 A1 | 12/2011 | Grieselhuber | |
| 2012/0042051 A1* | 2/2012 | Muret et al. | 709/219 |
| 2012/0084146 A1* | 4/2012 | Zwicky | 705/14.47 |
| 2012/0089429 A1 | 4/2012 | Geddes | |

FOREIGN PATENT DOCUMENTS

| | | |
|---|---|---|
| CN | 101137980 A | 3/2008 |
| CN | 101189608 A | 5/2008 |
| CN | 101432731 A | 5/2009 |
| EP | 2199969 A1 | 6/2010 |
| JP | 2005-174137 | 6/2005 |
| JP | 2004-047881 | 2/2007 |
| WO | WO 2004/003701 | 1/2004 |
| WO | WO 2004/079551 | 9/2004 |
| WO | WO 2005/043345 A2 | 5/2005 |
| WO | WO 2005/052755 | 6/2005 |
| WO | WO 2007/103646 | 9/2007 |
| WO | WO 2008/024997 | 2/2008 |
| WO | WO 2009/039242 A1 | 3/2009 |
| WO | WO 2011/043920 A2 | 4/2011 |

OTHER PUBLICATIONS

Chinese Office Action with English translation from CN Application No. 201080045386.8 mailed Jul. 2, 2014, 21 pages.
U.S. Appl. No. 13/428,975, filed Mar. 23, 2012.
U.S. Appl. No. 13/668,131, filed Nov. 2, 2012.
U.S. Appl. No. 13/668,133, filed Nov. 2, 2012.
U.S. Appl. No. 60/778,594, filed Mar. 1, 2006, Brian Bartell.
U.S. Appl. No. 60/823,615, filed Aug. 25, 2006, Dema Zlotin.
U.S. Appl. No. 60/868,702, filed Dec. 5, 2006, Ray Grieselhuber.
U.S. Appl. No. 60/868,705, filed Dec. 5, 206, Ray Grieselhuber.
U.S. Appl. No. 61/052,596, filed May 12, 2008, Michael Evans.
U.S. Appl. No. 61/111,639, filed Nov. 5, 2008, Michael Evans.
U.S. Appl. No. 61/114,400, filed Nov. 13, 2008, Matty Noble.
U.S. Appl. No. 61/160,628, filed Mar. 16, 2009, Matty Noble.
International Search Report and Written Opinion from International Application No. PCT/US2010/049704 mailed May 30, 2011, 9 pages.
Japanese Office Action with English translation mailed Jul. 2, 2013 from JP Patent Application No. 2012-533197, 7 pages.
Korean Office Action with English translation from KR Application No. 10-2012-7011525 mailed Apr. 30, 2013, 5 pages.
Office Action of the State Intellectual Property Office of People's Republic of China for Application No. 201080045386.8 (with English translation) Mar. 4, 2015.
Omniture, Measure What Matters: Defining Keyword Performance Indicators and Driving Business Performance Using Dashboards and Alerts, 2005.
Defendants Searchmetricsw GmbH and Searchmetrics, Inc.'s Invalidity Contentions, Aug. 26, 2014.
Exhibit D1, Invalidity Chart for U.S. Patent No. 8,671,089 Based on Search Engine Marketing, Inc., Driving Search Traffic to your Company's Web Site, Mike Moran et al., Aug. 26, 2014.
Exhibit D2, Invalidity Chart for U.S. Patent No. 8,671,089 Based on Search Engine Marketing, Inc., Second Edition, Aug. 26, 2014.
Exhibit E1, Invalidity Claim Chart for U.S. Patent No. 8,577,863 Based on Seach Engine Marketing Inc.: Driving Search Traffic to Your Company's Web Site, Aug. 26, 2014
Exhibit E-2, Invalidity Claim Chart for U.S. Patent No. 8,577,863 Based on Search Engine Marketing Inc., Second Edition, Aug. 26, 2014
Joint Claim Construction and Prehearing Statement, Oct. 27, 2014.
Mike Moran and Bill Hunt, Search Egine Marketing, Inc., IBM Press (uploaded in three parts), 2006.
Mike Moran and Bill Hunt, Search Engine Marketing, Inc., Search Engine IBM Press (uploaded in three parts), 2009.
Kristopher Jones, Search Engine Optimization, Wiley Publishing, 2008.

(56) References Cited

OTHER PUBLICATIONS

Exhibit A-1 to Defedants Searchmetrics GmbH and Searchmetrics, Inc.'s Invalidity Contentions, Invalidity Chart for US 8,478,700 Based on Search Engine Marketing, Inc., Aug. 26, 2014.
Exhibit A-2 to Defedants Searchmetrics GmbH and Searchmetrics, Inc.'s Invalidity Contentions, Invalidity Chart for US 8,478,700 Based on U.S. Patent No. 8,396,742, ("Blume"), Aug. 26, 2014.
Exhibit A-3 to Defedants Searchmetrics GmbH and Searchmetrics, Inc.'s Invalidity Contentions, Invalidity Chart for US 8,478,700 Based on WO 2008/024997 A2 ("Zlotin"), Aug. 26, 2014.
Exhibit A-4 to Defedants Searchmetrics GmbH and Searchmetrics, Inc.'s Invalidity Contentions, Invalidity Chart for US 8,478,700 Based on SEMDirector and Covario Enterprise Search Engine Optimization ("Covario"), Aug. 26, 2014.
Exhibit A-5 to Defedants Searchmetrics GmbH and Searchmetrics, Inc.'s Invalidity Contentions, Invalidity Chart for US 8,478,700 Based on Search Engine Marketing Inc., Second Edition, Aug. 26, 2014.
Exhibit A-6 to Defedants Searchmetrics GmbH and Searchmetrics, Inc.'s Invalidity Contentions, Invalidity Chart for US 8,478,700 Based on Products Made Available by Searchmetrics, Including Searchmetrics Suite ("Suite"), Aug. 26, 2014.
Exhibit A-7 to Defedants Searchmetrics GmbH and Searchmetrics, Inc.'s Invalidity Contentions, Invalidity Chart for US 8,478,700 Based on Enge, E. et al., "The Art of SEO", Aug. 26, 2014.
Exhibit B-1 to Defedants Searchmetrics GmbH and Searchmetrics, Inc.'s Invalidity Contentions, Invalidity Claim Chart for U.S. Pat. No. 8,478,746 Based on Search Engine Marketing, Inc., Aug. 26, 2014.
Exhibit B-2 to Defedants Searchmetrics GmbH and Searchmetrics, Inc.'s Invalidity Contentions, Invalidity Claim Chart for U.S. Pat. No. 8,478,746 Based on SEMDirector and Covario Enterprise Search Engine Optimization ("Covario"), Aug. 26, 2014.
Exhibit B-3 to Defedants Searchmetrics GmbH and Searchmetrics, Inc.'s Invalidity Contentions, Invalidity Claim Chart for U.S. Pat. No. 8,478,746 Based on Search Engine Marketing, Inc., Second Edition, Aug. 26, 2014.
Exhibit B-4 to Defedants Searchmetrics GmbH and Searchmetrics, Inc.'s Invalidity Contentions, Invalidity Claim Chart for U.S. Pat. No. 8,478,746 Based on Products Made Available by Searchmetrics, Including Searchmetrics Suite ("Suite"), Aug. 26, 2014.
Exhibit B-5 to Defedants Searchmetrics GmbH and Searchmetrics, Inc.'s Invalidity Contentions, Invalidity Claim Chart for U.S. Pat. No. 8,478,746 Based on Products Sold and Services Provided by SEMRush, Aug. 26, 2014.
Exhibit B-6 to Defedants Searchmetrics GmbH and Searchmetrics, Inc.'s Invalidity Contentions, Invalidity Claim Chart for U.S. Pat. No. 8,478,746 Based on Enge, E. et al., "The Art of SEO", Aug. 26, 2014.
Exhibit C-1 to Defedants Searchmetrics GmbH and Searchmetrics, Inc.'s Invalidity Contentions, Invalidity Claim Chart for U.S. Patent No. US 8,135,706 Based on Search Engine Marketing, Inc., Aug. 26, 2014.
Exhibit C-2 to Defedants Searchmetrics GmbH and Searchmetrics, Inc.'s Invalidity Contentions, Invalidity Claim Chart for U.S. Patent No. US 8,135,706 Based on SEMDirector and Covario Enterprise Search Engine Optimization, Aug. 26, 2014.
Exhibit C-3 to Defedants Searchmetrics GmbH and Searchmetrics, Inc.'s Invalidity Contentions, Invalidity Claim Chart for U.S. Patent No. US 8,135,706 Based on Search Engine Marketing, Inc., Second Edition, Aug. 26, 2014.
Exhibit C-4 to Defedants Searchmetrics GmbH and Searchmetrics, Inc.'s Invalidity Contentions, Invalidity Claim Chart for U.S. Patent No. US 8,135,706 Based on Products Sold and Services Provided by SEMRush, Aug. 26, 2014.
Exhibit C-5 to Defedants Searchmetrics GmbH and Searchmetrics, Inc.'s Invalidity Contentions, Invalidity Claim Chart for U.S. Patent No. US 8,135,706 Based on Products Made Available by Searchmetrics, Including Searchmetrics Suite, Aug. 26, 2014.
Exhibit F to Defedants Searchmetrics GmbH and Searchmetrics, Inc.'s Invalidity Contentions, Aug. 26, 2014.
U.S. District Court California Northern California District (San Francisco) Civil Docket for Case # 3:14-cv-01009-HSG, Feb. 27, 2015.
The Superior Court of California, County of Santa Clara, Case Information, 1-13-CV-256794, BrightEdge Technologies, Inc. vs. G. Martinez, Feb. 27, 2015.
AOL, SEO Tools Guide, Technical User Manual, Aug. 2006.
Eric Enge et al., The Art of SEO (uploaded in three parts), Oct. 2009.
Mike Roberts, Building Metrics to Highlight Content Opportunities, 2009.
Brian Clifton, Advanced Web Metrics with Google Analytics, 2008.
Omniture, Measure What Matters: Defining Key Performance Indicators and Driving Business Performance Using Dashboard and Alerts, 2005.
Omniture, Best Practices for Conversion: The New Engagement Funnel in 7 Steps, May 2006.
SEMRush, la herramienta SEO definitiva, http://www.3wmk.com/blog/semrush-la-herramienta-seo-definitiva.htm, Aug. 16, 2010.
Glenn Sanford, Glenn's Mega Agent and SEO Blog, SEMRush—What is the Value of Your Traffic?, http://activerain.trulia.com/blogsview/817826/semrush--what-is-the-value-of-your-traffic-, Dec. 2, 2008.
Fábio Ricotta, SEM Rush no Brasil?, http://www.agenciamestre.com/ferramentas/sem-rush-no-brasil/, Jun. 22, 2010.
Fábio Ricotta, Táticas Avançadas de SEO e Links Patrocinados com o SEM Rush, http://www.agenciamestre.com/ferramentas/taticas-avancadas-de-seo-e-links-patrocinados-com-o-sem-rush/.
Blog referencement, SEMRush un outil d'analyse compétitive disponible pour la France, http://blog.referencementschool.com/semrush-un-outil-danalyse-competitive-disponible-pour-la-france/, Jan. 25, 2010.
SEMRush: Logiciel francophone gratuit de recherche de mots clés, http://catalystentrepreneur.com/world/2010/04/26/semrush-logiciel-grancophone-gratuit-de-recherche-de-mots-cles/, Apr. 26, 2010.
SEMRush lanza su base de datos en español, http://www.enfoquesdigitales.com/blog/semrush-lanza-su-base-de-datos-en-espaol.html Apr. 16, 2010.
Luke Molton, How to Value a Website that Doesn't Report Revenue, http:flippa.com/blog/how-to-value-a-website-without-revenue/, Dec. 8, 2009.
Ben McKay, 4 tips to starting your keyword research with SEM Rush, Nov. 30, 2009, http://www.goodwebpractices.com/seo-sem-rush-keyword-research-tips.html, Nov. 30, 2009.
Bill Sebald, Tools to Help Learn from Competition, http://www.greenlaneseo.com/blog/2009/10/tools-to-help-learn-from-competition/, Oct. 9, 2009.
Jamey Bridges, A balanced online marketing approach with SEMRush, http://internetrealestatesuccess.com/2008/11/20/391/, Nov. 20, 2008.
SEMRush lanza su aplicación de gestión SEO/SEM en español, http://jorgequintas.com/search-engine-optimization/semrush-lanza-su-aplicacion-de-gestion-seosem-en-espanol, May 14, 2010.
Carte de la visibilité et mots clés d'un site Web avec SEMRush, http://www.laurentbourrelly.com/blog/670.php, Apr. 30, 2010.
Semrush SEO Competition Keyword Tool Review, http://muratos.hubpages.com/hub/Semrush--Beyond-Your-SEO-Expectations, Oct. 3, 2010.
SEMRush Keyword Analyse, http://netheweb.de/marketing-tipstricks/semrush-keyword-analyze/, Apr. 1, 2010.
Learn More about SEM Rush-Sponsored Post, http://www.ppchero.com/learn-more-about-sem-rush-sponsored-post/, Oct. 29, 2009.
Ann Smarty, SEMRush: Advanced Keyword and Competitor Research, http://www.searchenginejournal.com/semrush-advanced-keyword-and-competitor-research/8000/, Dec. 10, 2008.
Adam Audette, Enterprise SEO Tools, Part 2: The Cloud, http://searchengineland.com/enterprise-seo-tools-part-2-the-cloud-46133, Jul. 16, 2010.
Josh Dreller, Essential Competitive Intelligence Platforms for Your PPC Toolbox, http://searchengineland.com/essential-competitive-intelligence-platforms-for-your-ppc-toolbox-38613, Mar. 25, 2010.
Aaron Wall, Tracking Your SEO Success With Charts, http://searchengineland.com/tracking-your-seo-success-with-charts-33321, Jan. 14, 2010.

(56) References Cited

OTHER PUBLICATIONS

SEMrush Review, http://www.seerinteractive.com/blog/semrush-review, Oct. 15, 2009.
SEMRush, la version francophone est Live!, http://semrusheurope.agence-presse.net/2010/04/26/outil-gratuit-de-recherche-de-mots-cles/, Apr. 26, 2010.
SEMRush—What's Inside?, http://seocorner.wordpress.com/2009/01/26/semrush-whats-inside/, Jan. 26, 2009.
Aaron Wall, SEM Rush Review & Free Trial SEMRush Coupons, http://www.seobook.com/sem-rush-coupons, Oct. 20, 2011.
Aaron Wall, SEM Rush Search Marketing Research—Review of SEMRush.com, http://www.seobook.com/sem-rush-search-marketing-research-review-semrush-com, Nov. 8, 2008.
SEMRush Suchmaschinenmarketing Tool im Alfa-Test, http://seo-scout.org/gadget/semrush-suchmaschinenmarketing-tool-im-alfa-test.html, Jan. 28, 2009.
Tout savoir des sites web concurrents: mots des, adwords, provenance du trafic, http://www.tubbydev.com/2010/03/tout-savoir-des-sites-wb-concurrents-mots-cles-adwords-provenance-du-trafic.html#U_uJEP1dXup, Mar. 3, 2010.
SEO Tool Review: SEM Rush, http://webmarketcentral.blogspot.com/2009/12/seo-tool-review-semrush.html, Dec. 21, 2009.
SEM Marketing with SEMRush, http://www.webtrafficroi.com/sem-marketing-with-semrush/, Jun. 9, 2009.
"Two main SEMRush reports—organic and AdWords keywords", SEMRush, [online], Internet URL: <<http://www.youtube.com/watch?v=1XN4UFFS5mc>>, Oct. 29, 2009.
using SEMRush to find out competing sites in Google, http://www.youtube.com/watch?v=EARxcdepz7I, Oct. 29, 2009.
SEMRush Keywords, http://www.youtube.com/watch?v=bZYirY6GLe0, Jun. 30, 2009.
Competitors in Google organic search results—how to, http://www.youtube.com/watch?v=b2kGrV55X5s, Jun. 30, 2009.
Competitors in Google AdWords results—how to find, http://www.youtube.com/watch?v=EUn2ZFTxg64, May 21, 2009.
SEMRush—Adwords keywords report overview, http://www.youtube.com/watch?v=lxtffF5flq8, May 8, 2009.
semrush.com: organic report overview, http://www.youtube.com/watch?v=L6Lg7-rrDq8, Apr. 30, 2009.
How to use SEMRush.com for keywords research?, http://www.youtube.com/watch?v=zm_U9KMVOHc, Jan. 10, 2010.
Keyword Research with AdWordAccelerator & SEMRush, http://www.youtube.com/watch?v=fOpY40f3-zg, Nov. 8, 2009.
Introduction à SEMRish, http://vimeo.com/8952147, 2010.
SEO Tool SEM Rush Adds New Keyword Trend Data, http://seodesignsolutions.com/blog/seo-resources/seo-tool-sem-rush-adds-new-keyword-trend-data/, Dec. 22, 2009.
Bo Xing et al., The Impact of Search Engine Optimization on Online Adverting Market, 2004.
Ravi Sen, Optimal Search Engine Marketing Strategy, 2005.
Harold Davis, Search Engine Optimization, Building Traffic and Making Money with SEO, 2006.
Michael P. Evans, Analysing Google rankings through search engine optimization data, 2007.
Covario, Inc., Competitive Search Insight, http://web.archive.org/web2009/0823055051/http://www.covario.com/products_competitive_search_insight.shtml, 2009.
Covario, Inc., Interactive Marketing Analytics, http://web.archive.org/web/20090823041004/http://www.covario.com/?, 2009.
Covario, Inc., Interactive Marketing Analytics Solutions for Corporate Marketing, 2008.
Covario, Inc., Paid Search Insight, http://web.archive.org/web/200908064509/http://covario.com/products_paid_search_insight.shtml, 2009.
Covario, Inc., Organic Search Insight, http://web.archive.org/web/20090823055621/http://www.covario.com/products_organic_search_insight.shtml?, 2009.
Covario, Inc., Organic Search Insight, Interactive Marketing Analytics Software, 2008.
Covario, Paid Search Insight, Interactive Marketing Analytics Software, 2008.
Glev (SEOQuake) no viene, pero . . . , http://www.congresoseoprofesional.com/2010/08/10/goev-seoquake-no-pero/, Jul. 5, 2014.
Keyword Research: SEMRush, http://seoexpert.tv/seo-tools/semrush.html, Sep. 17, 2009.
Searchmetrics Rapid—Testbericht, http://www.seo-united.de/blog/seo/searchmetrics-rapid-testbericht.hm, Dec. 10, 2009.
Omniture, Metric Definitions, Metrics for SiteCatalyst, and Discover, Aug. 13, 2008.
Omniture, The Conversion Funnel & Persuasion Architecture: How to Continually Fine-tune Your Site to Deliver Superior Results, 2005.
Semphonic, Implementation Toolkit for Omniture SiteCatalyst: Omniture SiteCatalyst Implementation Guide, Jul. 2010.
Omniture, SiteCatalyst Metrics, Visits and Unique Visitors, Apr. 17, 2008.
Petition for Inter Partes Review of U.S. Pat. No. 8,478,700, Jul. 31, 2014.
Declaration of Ivan Zatkovich in Support of Petition for Inter Partes Review of U.S. Pat. No. 8,478,700, Sep. 3, 2014.
Patent Owner BrightEdge Technologies, Inc.'s Preliminary Response to Petition for Inter Partes Review of U.S. Pat. No. 8,478,700, Nov. 13, 2014.
Decision Denying Institution of Inter Partes Review of U.S. Pat. No. 8,478,700, Feb. 2, 2015.
Petitioner's Motion for Rehearing of Decision Denying Inter Partes Review of U.S. Pat. No. 8,478,700, Mar. 3, 2015.
Excerpt from Webster's Ninth New Collegiate Dictionary ("correlate" and "correlation"), 1990.
WebPosition, Product Reviews, https://web.archive.org/web/19981201072230/http:/webposition.com/product-reviews.htm, 1998.
WebPosition, Key Features, https://web.archive.org/web/19981201224227/http://webposition.com/keyfeatures.htm, 1998.
Press Releases, Webtrends Celebrates 20 Years of Digital Marketing Success, http://webtrends.com/about/press-room/press-releases/webtrends-celebrates-20-years-of-digital-marketing-success, Jan. 21, 2014.
Urchin from Google, The End of an Era for Urchin Software, http://www.google.com/urchin/index.html.
WordTracker, Discover the keywords that will skyrocket your website traffic!, https://web.archive.org/web/19991009013532/http:/www.wordtracker.com/, Oct. 9, 1999.
grub.org, https://web.archive.org/web/20001206121900/http:/www.grub.org/, Dec. 6, 2000.
SEOmoz.org, https"//web.archive.org/web/20050601023538/http:/seomoz.com/tools.php, Jun. 1, 2005.
SoftwareSolutions.net, http://web.archive.org/web/19990210173627/http:/softwaresolutions.net/netsubmitter/plugins.htm, Feb. 10, 1999.
SEO Administrator, Seo tool, site promotion software program, https://web.archive.org/web/20050331055423/http:/www.seoadministrator.com/, Mar. 31, 2005.
SpyFu.com, https://web.archive.org/web/20071006135847/http:/spyfu.com/, Oct. 6, 2007.
Excerpt from a Dictionary of Modern American Usage ("correlation"), 1998.
Excerpt from Kaushik, Web Analytics 2.0, 2010.
Excerpt from Landing Page Optimization, 2012.
Petition for Inter Partes Review of U.S. Pat. No. 8,478,746, Sep. 18, 2014.
Patent Owner BrightEdge Technologies, Inc.'s Preliminary Response to Petition for Inter Partes Review of U.S. Pat. No. 8,478,746, Jan. 6, 2015.
Decision Denying Inter Partes Review of U.S. Pat. No. 8,478,746, Feb. 10 2015.
Declaration of Ivan Zatkovich in Support of Petition for Inter Partes Review of U.S. Pat. No. 8,478,746, Sep. 17, 2014.
Google Advanced Search, https://web.archive.org/web/20060623174653/http://www.google.com/advanced_search?hl=en, Jun. 23, 2006.
Google Search, https://web.archive.org/web/20021008072141/http://www.google.com, Oct. 8, 2002.

(56) References Cited

OTHER PUBLICATIONS

Google Blog Search, https://web.archive.org/web/20051101004851/http://blogsearch.google.com/, Nov. 1, 2005.
Google Advanced Search, https://web.archive.org/web/20001214081900/http://www.google.com/advanced_search?hl=en, Dec. 14, 2000.
WebPosition Gold Features, https://web.archive.org/web/19990421042139/http://www.webposition.com/product.htm, Apr. 21, 1999.
Google Inside AdWords, http://adwords.blogspot.com/2007/07/discover-your-share-of-voice-with.html, Jul. 5, 2007.
Radian6, http://web.archive.org/web/20070216144611/http://www.radian6.com/technology/, Feb. 16, 2007.
PostRank, http://web.archive.org/web/20080912073326/http://postrank.com/, Sep. 12, 2008.
Marketing TechBlog, History of Web and Social Analytics, http://www.marketingtechblog.com/infographic-history-web-social-analytics/, Jun. 21, 2011.
Samuel Axon, Mashable, Webtrends Launches Analytics for Facebook Marketers, http://mashable.com/2010/02/25/webtrends-facebook-analytics/, Feb. 25, 2010.
Excerpt from English Dictionary, Complete and Unabridged ("share of voice"), 2003.
Petition for Inter Partes Review of U.S. Pat. No. 8,135,706, Nov. 11, 2014.
Patent Owner BrightEdge Technologies, Inc.'s Preliminary Response to Petition for Inter Partes Review of U.S. Pat. No. 8,135,706, Mar. 3, 2015.
Declaration of Ivan Zatkovich in Support of Petition for Inter Partes Review of U.S. Pat. No. 8,135,706, Nov. 11, 2014.
Press Releases, BrightEdge Announces US Patent for Operationalizing SEO, http://www.brightedge.com/2012-04-12-BrightEdge-Announces-US-Patent, Apr. 12, 2012.
CA Office Action with Examination Search Report from Canadian Intellectual Property Office for CA Application No. 2,791,080, Feb. 24, 2015.

\* cited by examiner

CORRELATING WEB PAGE VISITS AND CONVERSIONS WITH EXTERNAL REFERENCES

RELATED APPLICATIONS

This application is a continuation under 35 U.S.C. §120 of U.S. patent application Ser. No. 12/574,069, filed 6 Oct. 2009, which is incorporated herein by reference in its entirety.

BACKGROUND

The Internet has changed the way people gather information, establish relationships with one another and even how people communicate with one another. Additionally, the Internet has changed the way companies seek potential customers and even what the meaning of a business is. It has changed the way companies advertise, sell, coordinate with one another and compete with one another. With this change has come a huge explosion in the number of Web Pages for people to visit. Search engines, such as Google, Bing, Yahoo and others have come into being to help people find their way to Web Pages that they desire. As a result, the number and types of channels that a marketer can leverage has also exploded—beyond organic and paid search, they can also leverage blogs, social media, video sharing, mobile content and ads, display ads, and many other channels.

However, many Web Pages do not have a good way of tracking how visitors have come to find their Web Pages and the details concerning the reference that drove the visitor to come to the web page. Indeed, many Web Pages cannot accurately determine how many people have visited the Web Page and are instead forced to estimate the number of visitors. Conventionally, this is done with a tracking pixel or some other similar mechanism. The tracking pixel constitutes the code to create a single pixel on the Web Page. However, the tracking pixel also contains the code to perform a certain action or request a certain item from a tracking server. The tracking server keeps track of how many actions or requests it receives, which is used to estimate the number of visitors who have visited the Web Page.

Nevertheless, this can lead to inaccuracies in many instances and provides little to no information about the marketers and the web page's performance from the external channel. In particular, it relies on the user's web browser to correctly execute the tracking pixel and on the tracking server to correctly track the number of actions or requests. However, the tracking pixel only sees very limited data from the referral headers about how the visitor came to the website. Without directly crawling and analyzing the page where the visitor came from, there is inaccurate and very inaccurate view into how the visitor got to a web page, what was our performance in those external channels, and how a marketer should optimize their online marketing campaigns.

However, the number of visitors to a Web Page, and their actions once there, may have a significant impact on the success of the Web Page. For example, many Web Pages rely on tracking the number of visitors to bring in advertising revenue to sustain the Web Page or supplement the revenue that the Web Page brings in. Therefore, accurately determining the number and behavior of visitors, how the visitors got to the web page, and correlating this with the marketing campaigns and efforts will help the marketer to focus on and optimize campaigns to bring additional revenue.

Additionally, tracking the behavior of the actions of each visitor would allow the Web Page to be marketed more efficiently. In particular, many Web Pages track their organic search performance in search engines based on number of visits for certain keywords. However, they cannot determine how many visitors came as a result of a particular search engine result and rank position to the Web Page, instead they must estimate this based on the data (referral header) passed to the web page which only helps them determine the number of visitors that came from a specific keyword. Without understanding key attributes of their performance on the search engine, they cannot accurately determine the effectiveness of their marketing efforts. Moreover, they cannot determine how their organic search marketing efforts would impact what those visitors do on the Web Page when they have found the Web Page. For example, if a Web Page is selling merchandise, there is currently no way to determine who completed a particular purchase on the Web Page and compare that with how that visitor came to the Web Page.

Therefore, owners and designers of Web Pages must estimate how visitors have come to the Web Page and what they do once they are on the Web Page. This does not allow them to determine which actions would present a better chance for success of the Web Page. For example, a Web Page owner might be confronted with limited marketing budgets that allow them to either improve their ranking in search engine results or that will place advertisements for their Web Page on other Web Pages but not both. Currently, the Web Page owner must choose which strategy to follow with limited information on which would be more effective.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One example embodiment includes a method for correlating external references to a Web Page with conversions performed by one or more visitors to the Web Page. The method includes receiving the Web Page to monitor and determining one or more conversions to correlate. The one or more conversions to correlate include one or more actions performed on the Web Page by a visitor to the Web Page. The method also includes identifying the visitor to the Web Page. The visitor to the Web Page completed at least one action included in the conversions to correlate. The method also includes identifying the at least one action completed by the visitor and identifying an external reference that directed the visitor to the Web Page. The external reference contains a reference to the Web Page.

Another example embodiment includes a method for correlating external references to a Web Page with the number and value of conversions on the Web Page. The method includes receiving a Web Page to monitor and identifying a conversion on the Web Page. The conversion includes one or more actions performed on the Web Page by a visitor to the Web Page. The method also includes identifying the visitor to the Web Page, where the visitor to the Web Page completed the conversion on the Web Page. The method further includes identifying an external reference that directed the visitor to the Web Page, where the external reference contains a reference to the Web Page.

Yet another example embodiment includes a system for correlating external references to a Web Page with the number of conversions on the Web Page. The system includes an information database. The information database includes data that identifies: one or more conversions on the Web Page, one or more visitors to the Web Page and one or more external references. The one or more external references include a reference to the Web Page used by the one or more visitors to the Web Page. The system also includes a job coordinator. The job coordinator is configured to divide the one or more conversions into one or more groups for correlating. The system further includes a cloud warehouse. The cloud warehouse includes one or more nodes that contain one more computing resources required to correlate the one or more conversions with the one or more visitors and the one or more external references. The job coordinator is also configured to assign each of the one or more groups to one of the one or more nodes in the cloud warehouse for correlation.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Reference will now be made to the figures wherein like structures will be provided with like reference designations. It is understood that the figures are diagrammatic and schematic representations of some embodiments of the invention, and are not limiting of the present invention, nor are they necessarily drawn to scale.

Figure 1:
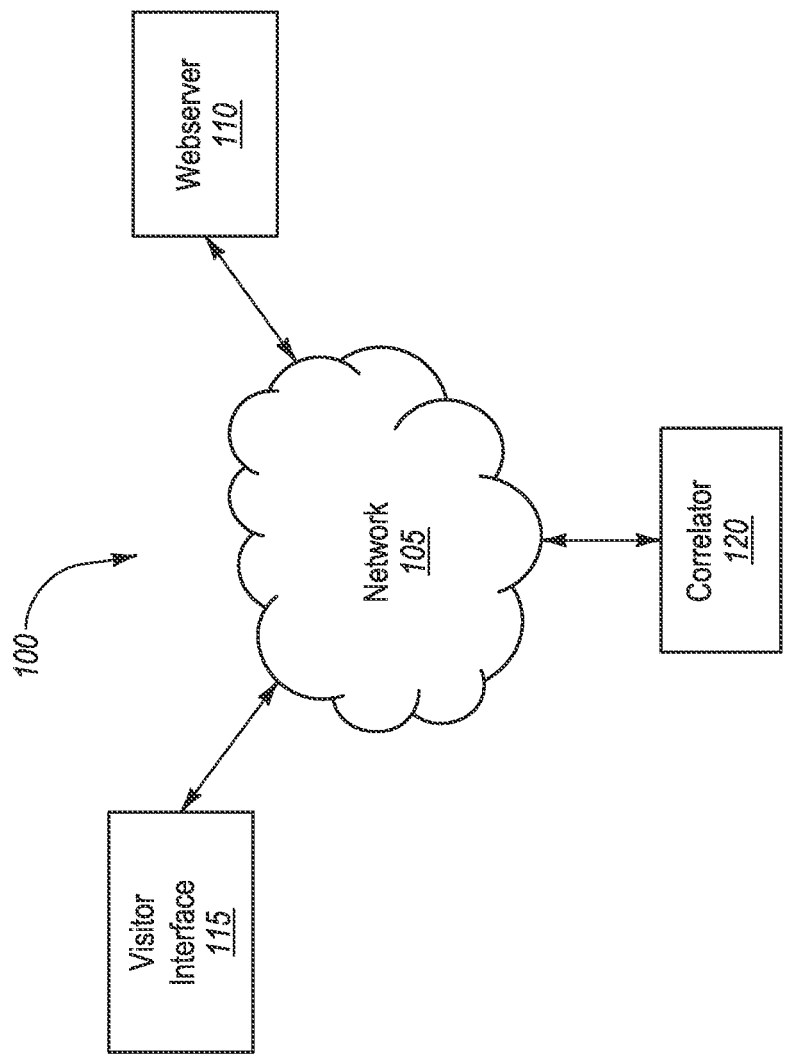
FIG. 1 illustrates a block diagram of a system for correlating external references to a Web Page with the number of conversions on the Web Page.

FIG. 1 illustrates a block diagram of a system 100 for correlating external references to a Web Page with the number of conversions on the Web Page in accordance with some embodiments. It should be noted that "Web Page" as used herein refers to any online posting, including domains, sub-domains, Web posts, Uniform Resource Identifiers ("URIs"), Uniform Resource Locators ("URLs"), images, videos, or other piece of content and non-permanent postings such as e-mail and chat unless otherwise specified.

In at least one implementation, correlating external references to a Web Page with the number of conversions on the Web Page can allow the webmaster to determine the number of conversions provided by each external reference. This can, in turn, allow a webmaster to focus on increasing the number or quality of references that will best lead to an increased number of conversions on the Web Page. For example, correlating keyword searches, and the ranking of the Web Page within the search results, in search engines that include a reference to the Web Page can allow a webmaster to focus on improving the ranking of the Web Page in searches for identified keywords that are more likely to lead to a greater number of conversions.

In at least one implementation, conversions include a visitor to a Web Page completing a desired action on the Web Page. In particular, the nature of the desired action can include any desired use of the Web Page. Web Pages may be created and maintained for different purposes. For example, Web Pages can be content driven. That is, the Web Page can be designed to provide access to certain content. For example, the Web Page can be designed to provide news, information, research help or any other content for the use of the visitor. Additionally or alternatively, the Web Page can be designed for e-commerce. That is, the Web Page can be designed to allow a visitor to purchase certain products, such as products produced and/or sold by a manufacturer or other entity. Alternately or additionally, a Web Page can be designed to generate leads for a business. For example, the Web Page can include information regarding a manufacturer of a certain part and contact information, so that potential customers of the product can contact the manufacturer. One of skill in the art will appreciate that a Web Page can be designed to include one or more of these uses or any other use as desired by the webmaster.

In at least one implementation, external references to a web page can include any reference to the Web Page which directs a visitor to the web page. For example, an external reference can include text documents, such as blogs, news items, customer reviews, e-mails or any other text document which discusses the Web Page. Additionally or alternatively, an external reference can include a Web Page which includes a link to the Web Page. For example, an external reference can include other Web Pages, search engine results pages, advertisements or the like.

In at least one implementation, in a content driven Web Page a completed conversion can include a visitor loading the Web Page. In particular, the webmaster can be concerned with the number of visitors. For example, the number of visitors can determine the amount of advertising revenue produced by the Web Page, as described below. Accordingly, correlating the external reference to the number of conversions in a content driven Web Page can include determining the amount of traffic to the Web Page that is driven to the Web Page by the external reference.

Additionally or alternatively, if a Web Page is designed for e-commerce, conversions can include the amount of commerce created by an external reference. For example, a conversion can include the visitor purchasing an item from the Web Page. Additionally or alternatively, a conversion can include the amount spent by a customer on the Web Page. Accordingly, correlating the external reference to the number of conversions in an e-commerce site can include determining the number of visitors that are directed to the Web Page by an external reference and/or that purchase items from the Web Page. Additionally or alternatively, correlating the external reference to the number of conversions in an e-commerce site can include determining the average amount of money spent by visitors that are directed to the Web Page by an external reference.

In at least one implementation, if a Web Page is designed to generate leads to a business, conversions can include the number of visitors which contact the webmaster or other entity associated with the Web Page. For example, the Web Page can include a form that allows a user to request additional information regarding a particular product. Accordingly, correlating an external reference to the number of conversions in a lead generating Web Page can include determining the number of visitors and/or lead signups that have been directed by the external reference which complete the form for additional information.

FIG. 1 shows that the system 100 can include a network 105. In at least one implementation, the network 105 can be used to connect the various parts of the system 100 to one another. The network 105 exemplarily includes the Internet, including a global internetwork formed by logical and physical connections between multiple wide area networks and/or local area networks and can optionally include the World Wide Web ("Web"), including a system of interlinked hypertext documents accessed via the Internet. Alternately or additionally, the network 105 includes one or more cellular RF networks and/or one or more wired and/or wireless networks such as, but not limited to, 802.xx networks, Bluetooth access points, wireless access points, IP-based networks, or the like. The network 105 can also include servers that enable one type of network to interface with another type of network.

FIG. 1 also shows that the system 100 can include a web server 110. In at least one implementation, a web server 110 (or "webserver") can include any system capable of storing and transmitting a Web Page to a user. For example, the web server 110 can include a computer program that is responsible for accepting requests from clients (user agents such as web browsers), and serving them HTTP responses along with optional data contents, which can include HTML documents and linked objects for display to the user. Additionally or alternatively, the web server 110 can include a computing environment that can implement a computer program as described above.

In at least one implementation, the web server 110 can be capable of sending an error response if the request fails which may include some custom HTML or text messages to better explain the problem to end users. Additionally or alternatively, the web server 110 can include the capability of logging some detailed information, about client requests and server responses, to log files. In at least one implementation, this log information can be analyzed by a webmaster, as described below.

FIG. 1 further shows that the system includes a visitor interface 115. In at least one implementation, the visitor interface 115 includes a web browser that is implemented on a client device, such as a laptop computer, desktop computer, smartphone, Personal Digital Assistant, or the like. In particular, a web browser is a software application for retrieving, presenting, and traversing Web Pages on a network. For example, Web Pages can contain hyperlinks (or "links") which can allow visitors to navigate their browsers to related resources.

In at least one implementation, a visitor interface 115 can be used to present a Web Page to a visitor. For example, a visitor can input the name of the Web Page into the visitor interface 115 which then loads the Web Page. In particular, the name of the Web Page can include a prefix. In at least one implementation, the prefix of the Web Page can determine how the Web Page will be interpreted by the visitor interface 115. For example, the prefix can include "http:" which identifies a Web Page to be retrieved over the Hypertext Transfer Protocol (HTTP).

Additionally or alternatively, the prefix can include "https:" for HTTPS, "ftp:" for the File Transfer Protocol, "file:" for local files and "html:" for Hyper Text Markup Language. Additionally or alternatively, prefixes that the web browser cannot directly handle can be handed off to another application entirely. For example, "mailto:" Web Pages can be passed to the visitor's default e-mail application, and "news:" Web Pages can be passed to the visitor's default newsgroup reader.

In at least one implementation, in the case of http, https, file, and others, once the resource has been retrieved the visitor interface 115 can display it. Additionally or alternatively, html can be passed to the visitor interface's 115 layout engine to be transformed from markup to an interactive document. In particular, html can include or can load scripts (in languages such as JavaScript) which affect the behavior of html processors like Web browsers. Additionally or alternatively, visitor interfaces 115 can generally display any kind of content that can be part of a Web Page. Most visitor interfaces 115 can display images, audio, video, and XML files, and often have plug-ins to support Flash applications and Java applets. Upon encountering a file of an unsupported type or a file that is set up to be downloaded rather than displayed, the visitor interface 115 can prompt the user to save the file to disk.

FIG. 1 also shows that the system 100 includes a correlator 120. In at least one implementation, the correlator 120 can determine the number of conversions on a website that are due to a particular external reference. For example, the correlator 120 can determine what percentage of visitors that come to the Web Page from a particular external reference complete a conversion on the Web Page. Additionally or alternatively, the correlator 120 can determine what percentage of total conversions on the Web Page originate from a particular external reference.

Figure 2:
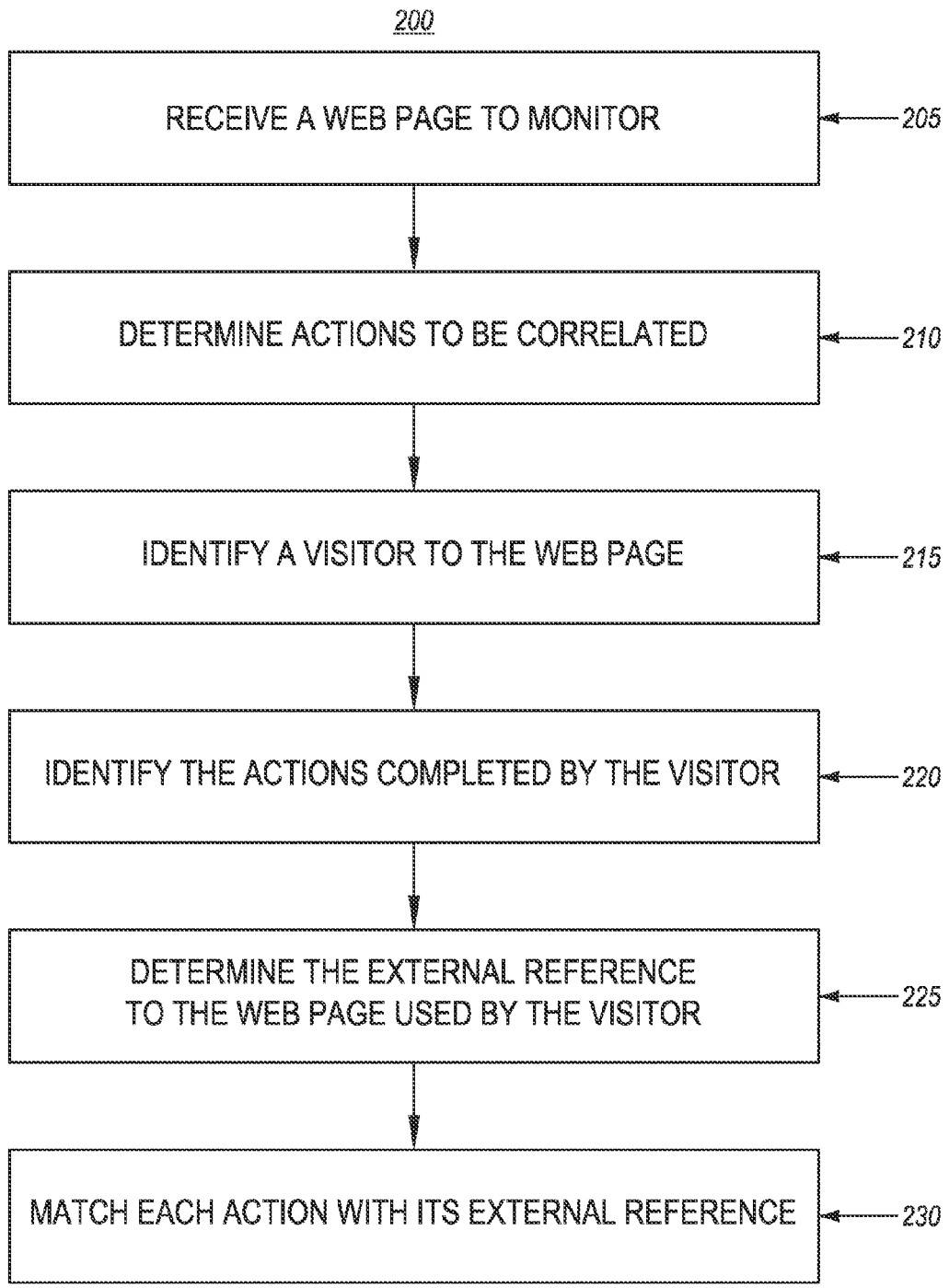
FIG. 2 is a flow diagram illustrating a method of correlating conversions by a visitor on a Web Page with an external reference.

FIG. 2 is a flow diagram illustrating a method 200 of correlating conversions by a visitor on a Web Page with an external reference in accordance with some embodiments. Correlating conversions by a visitor on a Web Page with an external reference can allow a webmaster to determine which external references are best at producing conversions. For example, a webmaster can determine which search results are most likely to result in desired conversions and can, therefore, focus marketing efforts on improving those search results, as discussed below.

The method 200 can be implemented using software, hardware or any combination thereof. If the method 200 is implemented using software, the steps of the method 200 can be stored in a computer-readable medium, to be accessed as needed to perform their functions. Additionally, if the method 200 is implemented using software, the steps can be carried out by a processor, field-programmable gate array (FPGA) or any other logic device capable of carrying out software instructions or other logic functions In at least one implementation, the method 200 can be implemented using a cloud warehouse. In particular, a cloud warehouse includes purchasing processing power over a network. In particular, the user need not own the physical infrastructure serving as host to the software platform. Instead, the user rents usage from a third-party provider. A user need not rent from a particular provider. Instead, the user can rent on an "as available basis". That is, the user can automatically contact third-party providers and obtain resources as needed. Accordingly, a number of calculations can be done simultaneously, as the calculations can be done in parallel. Additionally, the calculations can be cheaper since the user need not purchase the physical infrastructure.

In particular, if the method 200 is implemented in a cloud warehouse, conversions may first be divided into groups. For example, the method 200 can be performed at certain time intervals, with all conversions within the time interval correlated at one time. E.g., the method 200 can be carried out once a day with all of the conversions completed during the day analyzed with one another. In at least one implementation, each group can be assigned to a different node within the cloud warehouse. Accordingly, each group can be analyzed in parallel.

Additionally or alternatively, the method 200 can be implemented using a server or other single computing environment. If a server or other single computing environment is utilized, the conversions need not be divided into groups, since all conversions will be analyzed by the same server or single computing environment. Accordingly, less overall processing can be necessary. However, the server or single computing environment can experience downtime or otherwise delay the results.

Additionally or alternatively, some combination of cloud warehouse and server can be utilized to implement the method 200. For example, a server can be used to group conversions and send them to the cloud warehouse for processing. Additionally or alternatively, a cloud warehouse can be used to supplement the server as needed. For example, the cloud warehouse can be used if the amount of processing progresses beyond the abilities of the server.

FIG. 2 shows that the method 200 includes receiving 205 a Web Page to monitor. In at least one implementation, receiving 205 the Web Page to monitor includes receiving a domain name or a URL. For example, the webmaster can provide a URL and request that conversions are monitored on the Web Page for a certain period of time. Additionally or alternatively, receiving 205 the Web Page to monitor can include providing the code of the Web Page for the addition of one or more software products capable of tracking conversions, as described below.

FIG. 2 also shows that the method 200 includes determining 210 the type of conversions to be correlated. In at least one implementation, the conversions to be correlated can include purchases, following a link, following an advertisement, selecting content, such as images, videos and text, participating in a discussion or chat board, participating in a game, posting content, such as a blog, feeds or status updates, bookmarking a page, adding a content feed, such as rss or any other conversion on the Web Page that the webmaster desires to correlate.

FIG. 2 further shows that the method 200 includes identifying 215 a visitor to the Web Page. In at least one implementation, identifying 215 a visitor to the Web Page includes determining the Internet Protocol (IP) address of the visitor. In particular, an IP address is a numerical label that is assigned to devices participating in a computer network utilizing the Internet Protocol for communication between its nodes. Additionally or alternatively, identifying 215 a visitor can include providing a cookie to the visitor's web browser. In particular, a cookie (also tracking cookie, browser cookie, and HTTP cookie) can be a small piece of text stored on a user's computer by a web browser. For example, a cookie can consist of one or more name-value pairs containing bits of information such as user preferences, shopping cart contents, the identifier for a server-based session or other data used by websites.

Additionally or alternatively, identifying 215 a visitor to the Web Page can include providing a script or other software module in the Web Page code which identifies the visitor. For example, identifying 215 a visitor can include adding a JavaScript to the code of the Web Page which, when executed, can send desired information back to the web server. In at least one implementation, the code is executed by the visitor's browser and can track the actions of the visitor while on the Web Page. For example, the code can record the nature and time of actions of a purchase by the visitor so that the visitor, and therefore the external reference used by the visitor, can later be correlated with the purchase.

FIG. 2 also shows that the method 200 includes identifying 220 the conversions completed by the visitor. In at least one implementation, conversions on a Web Page can number in the millions. For example, popular social networking or content driven Web Pages can be visited by millions of people each day. Accordingly, a conversion on the Web Page needs to be matched with the visitor which performed the action. As discussed above, the conversions can be matched to which visitor performed them using code added to the Web Page and executed by the visitor's web browser. Additionally or alternatively, the Web Page may identify the IP address of user's who perform the action, which can later be matched to a list of all visitors and all actions of the visitor can be grouped with one another for analysis, as discussed below.

FIG. 2 also shows that the method 200 includes determining 225 the external reference to the Web Page used by the visitor. In at least one implementation, the external reference to the Web Page can include any reference which links to the Web Page. In particular, a link is a reference in a document to an external or internal piece of information. In at least one implementation, some text or other item in external reference is highlighted so that when clicked, the visitor's web browser automatically displays another page or changes the current page to show the referenced content.

Additionally or alternatively, determining 225 the external reference can include parsing the log files provided by the web server. In at least one implementation, web servers can provide log files to a web server when requesting a Web Page stored on the web server. These log files can include information about the external reference, including the URL of the external reference. Additionally or alternatively, the log files can include information regarding searches if the external reference is a search engine.

Additionally or alternatively, determining 225 the external reference can include parsing the search header of the Web Page request. In at least one implementation, the search header of the Web Page request can include information about the external reference which directed the visitor to the Web Page. For example, the search header can include the search engine used and the keyword searched.

In at least one implementation, determining 225 the external reference can include analyzing the full funnel of the visitor's activity prior to the visitor's conversion. In particular, the full funnel of the visitor's activity can include activity that results in the visitor coming to the Web Page that is not directly prior to the conversion. For example, the full funnel of the visitor's activity can include previous keyword searches. E.g., if the visitor comes to the Web Page and does not complete a conversion, but later returns and completes a conversion, the full funnel of the visitor's activity can include the visitor's visit to the external reference prior to the conversion. Additionally or alternatively, the full funnel of the visitor's activity can include the full path followed by the visitor to the Web Page. For example, the full funnel of the visitor's activity could include a keyword search, which leads to a blog about a product, which leads to a side-by-side review of related products which leads to the Web Page.

Additionally or alternatively, determining 225 the external reference can include determining the analytics of the external reference. In at least one implementation, the analytics of the external reference can include one or more channels. In particular, channels can include organic searches, organic links, paid links, page searches, linked advertisement networks, banner advertisements, contextual advertisements, e-mail, blogs, social networks, social news, affiliate marketing, mobile advertisements, media advertisements, video advertisements, videos, images, discussion forums, paid advertisements, display advertisements, news sites, rich media, social bookmarks, paid searches, wiki, mobile content, and in-game advertisements. Nevertheless, the channels are not limited to those mentioned but can include any relevant areas of the network, whether now existing or created in the future.

Additionally or alternatively, the analytics of the external reference can include one or more signals. In at least one implementation, the one or more signals include information about the external references to the Web Page. For example, advertisements placed at the top of a Web Page are much more visible, and therefore, are generally more expensive and are considered more effective than advertisements placed at the bottom of a Web Page. Therefore, if the external reference includes online advertisements, advertisement placement is an analytic of the Web Page that can be evaluated. Alternately or additionally, the one or more signals can include a keyword used in a search which identified the Web Page and the ranking of the Web Page within the search, and the competitive listings (other pages that rank within the search). Additionally or alternatively, the one or more signals can include one or more of: calendar date of the external reference, time of day the external reference was accessed or the like.

In at least one implementation, the one or more signals can include information about a link provided in the external reference to the Web Page. For example, the one or more signals can include the anchor text of the link. Anchor text (also link label or link title) is the visible, clickable text in a hyperlink. Additionally or alternatively, the one or more signals can include link tags. Link tags are information about the link. For example, the link tag can include a "nofollow" tag. Nofollow is an HTML attribute value used to instruct some search engines that a hyperlink should not influence the link target's ranking in a search engine's index.

Additionally or alternatively, signals within an e-mail message to be evaluated can include frequency of the e-mail message received, outbound links on the e-mail message, calendar date of the e-mail message received, time of day of the e-mail message received, or the like. In blogs, signals can include the number of mentions, and the sentiment of the mentions. For social media channels signals can include the number of user generated content with references and the number of votes for those references. For social networks, signals can include the number of mentions or number of applications that mention the page. Nevertheless, the signals to be evaluated are not limited to those mentioned but can include any relevant information about the references to the Web Page, whether now existing or created in the future.

In at least one implementation, detailed information about an external reference can be obtained by crawling the external reference. For example, crawling the external reference can include deep crawls and dynamic crawls. In particular, deep crawls include crawling the Internet for online references to the entity. Crawling the Internet can include searching one or more channels of the Internet for references to the Web Page and evaluating one or more signals in the reference.

In contrast, dynamic crawls can include evaluating references that have not been previously encountered in deep crawls. For example, dynamic crawls can include evaluating a reference to determine which channels the reference appears in and what signals the reference contains. In at least one implementation, a dynamic crawl can determine how the Web Page was referenced in a channel. For example, a dynamic crawl of a search results page can determine where the Web Page ranked in a keyword search, what competitors showed up in the keyword search, where the competitors ranked in the keyword search, how many visitors came to the Web Page from the searches results or any other analytics which can allow the webmaster to determine the effectiveness of marketing the Web Page within the external reference. Additionally or alternatively, a dynamic crawl of a blog, would include crawling the external reference, identifying that the external reference is a blog, determining the subject matter of the blog, determining the sentiment of the blog or any other analytics that can allow the webmaster to determine the effectiveness of the blog in producing conversions on the Web Page.

In at least one implementation, dynamic crawls can be used on external references that are more likely to change quickly. For example, social networking sites, such as Twitter or Facebook, can include a sharp increase in the number of mentions of a Web Page as users of the social network pass the information to one another. Accordingly, constant crawling of the external reference can indicate changes in conversion numbers that result from the changing mentions in the external reference.

Additional information regarding channels, signals, and the collecting and scoring of online references is provided in U.S. patent application Ser. No. 12/436,704, entitled "COLLECTING AND SCORING ONLINE REFERENCES," filed May 6, 2009. The foregoing patent application is incorporated herein by reference in its entirety.

FIG. 2 further shows that the method 200 includes matching 230 each conversion with the referring external reference. In particular, matching 230 each conversion with the referring external reference can include matching a particular visitor with a particular conversion and further matching the visitor with an external reference. For example, if a particular conversion is matched with a particular visitor, the log files can be searched for the identified visitor. The log files that have been identified can then be parsed to determine the external reference used by the visitor to find the Web Page.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 3:
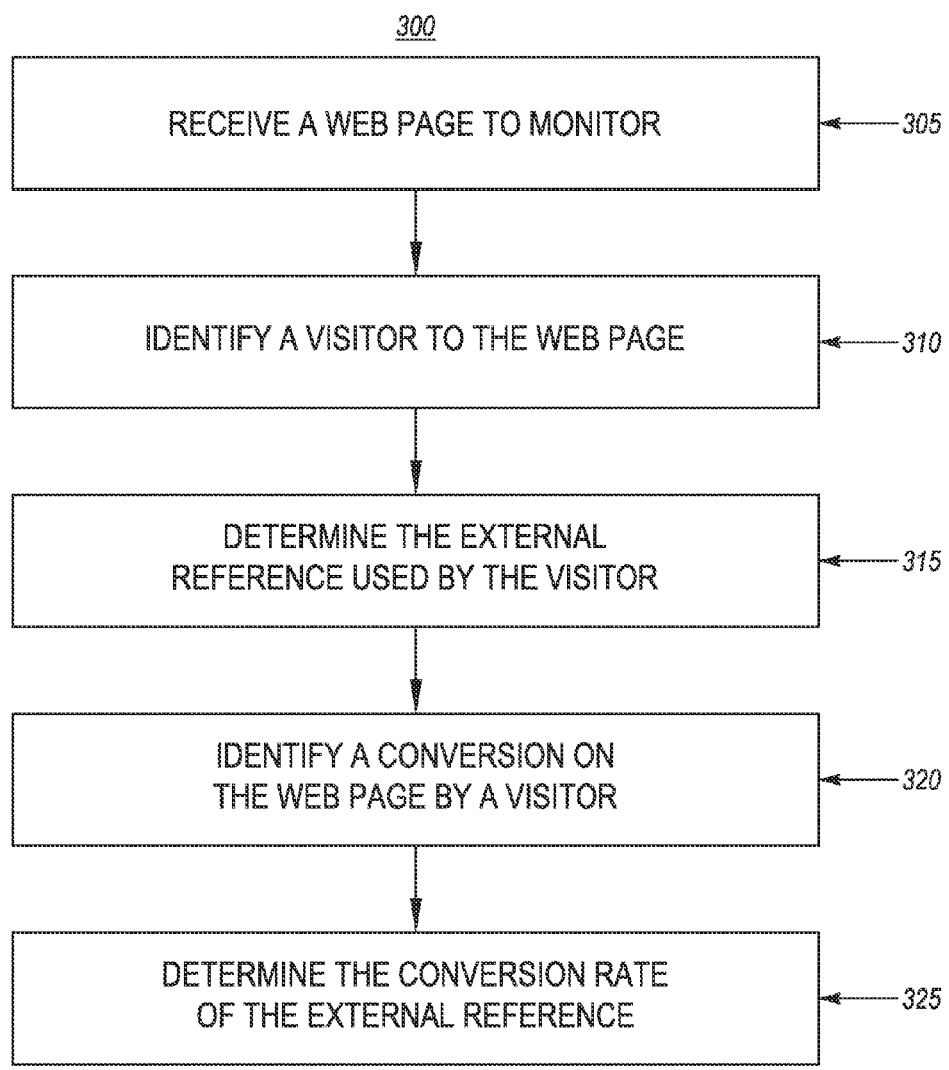
FIG. 3 illustrates a method for determining the conversion rate of an external reference to a Web Page.

FIG. 3 illustrates a method 300 for determining the conversion rate of an external reference to a Web Page in accordance with some embodiments. The method 300 can be implemented using software, hardware or any combination thereof. If the method 300 is implemented using software, the steps of the method 300 can be stored in a computer-readable medium, to be accessed as needed to perform their functions. Additionally, if the method 300 is implemented using software, the steps can be carded out by a processor, field-programmable gate array (FPGA), cloud warehouse or any other logic device capable of carrying out software instructions or other logic functions FIG. 3 shows that the method 300 includes receiving 305 a Web Page to monitor. In at least one implementation, receiving 305 the Web Page to monitor includes receiving a domain name or a URL. For example, the webmaster can provide a URL and request that conversions are monitored on the Web Page for a certain period of time. Additionally or alternatively, receiving 305 the Web Page to monitor can include providing the code of the Web Page for the addition of one or more software products capable of tracking conversions, as described below.

In at least one implementation, receiving 305 a Web Page to monitor can include receiving one or more entry pages to the Web Page. For example, the Web Page to monitor can include a collection of pages. In particular, the Web Page can include a main or home page which serves as an entry page and includes links to other pages grouped within the collection of pages. That is, the entry page allows a visitor to select other pages within the Web Page. In at least one implementation, the entry page can include the page to which some or all of the external references point.

FIG. 3 further shows that the method 300 includes identifying 310 a visitor to the Web Page. In at least one implementation, identifying 310 a visitor to the Web Page includes determining the Internet Protocol (IP) address of the visitor. Additionally or alternatively, identifying 310 a visitor can include providing a cookie to the visitor's web browser.

Additionally or alternatively, identifying 310 a visitor to the Web Page can include providing a script or other software module in the Web Page code which identifies the visitor. For example, identifying 310 a visitor can include adding a JavaScript to the code of the Web Page which, when executed, can send desired information back to the web server. In at least one implementation, the code is executed by the visitor's browser and can track the actions of the visitor while on the Web Page. For example, the code can record the nature and time of actions of a purchase by the visitor so that the visitor, and therefore the external reference used by the visitor, can later be correlated with the purchase.

FIG. 3 further shows that the method 300 includes determining 315 the external reference used by the visitor. In at least one implementation, identifying an external reference includes identifying a previous Web Page visited by the user which contains a reference to the Web Page. In particular, an external reference can include any Web Page which directs a visitor to the monitored Web Page. For example, an external reference can include a search engine which directs the visitor to the Web Page based on the results of a keyword search. Additionally or alternatively, an external reference can include an advertisement placed on a Web Page which directs a visitor to the Web Page. For example, the advertisements can include advertisements placed through an ad placement service or can include advertisements that are contracted for specifically on a certain Web Page. Additionally or alternatively, an external reference can include direct references to the Web Page. For example, direct references can include references from a business partner or associate or from a reviewer or other content provider.

In at least one implementation, the external reference can include a group of external references. For example, a webmaster can be interested in the number of conversions based on a search that includes different city names. For example, if a business is located in numerous cities, the webmaster can be interested in the number of conversions that come from a keyword search that includes any of the city names, regardless of which city is actually searched. Accordingly, the external references can be grouped with one another, regardless of which city is actually searched.

In at least one implementation, the external reference can be determined 315 using log files included in a server request. For example, the log files can be parsed to determine Web Pages previously accessed by the visitor to the Web Page. Additionally or alternatively, the external reference can be determined 315 from a search referral header. For example, if the previous Web Page was a search engine, the request to the web server for the Web Page might include a search header which contains information regarding the external reference.

FIG. 3 further shows that the method 300 includes determining 320 whether the visitor completes a conversion on the Web Page. In at least one implementation, the cookie and/or JavaScript included with the Web Page code can track whether the user completes a conversion and transmit the information to the web server or to destination designated to receive the information. Additionally or alternatively, whenever a conversion is complete, the Web Page code can request the appropriate information regarding the visitor. This information can, in turn be matched to an identified visitor, as described above.

FIG. 3 further shows that the method 300 includes determining 325 the conversion rate of the external reference. As described above, the conversion rate can include the number of conversions on a website that are due to a particular external reference. For example, the conversion rate can include the percentage of visitors that come to the Web Page from a particular external reference complete a conversion on the Web Page. Additionally or alternatively, the conversion rate can include the percentage of total conversions on the Web Page that originate from a particular external reference.

In at least one implementation, determining 325 the conversion rate of the external reference can include determining the conversion rate of a single entry page. For example, the conversion rate can include the number of conversions on a single page within a Web Page. Additionally or alternatively, determining 325 the conversion rate of the external reference can include determining the conversion rate of all pages within the Web Page. For example, the webmaster can only be interested in the number of people that complete conversions of any type, whether included in an original search or whether arrived at by browsing the Web Page.

Additionally or alternatively, determining 325 the conversion rate of the external reference can include determining the conversion rate of a group of external references. In particular, the webmaster can group one or more external references based on criteria selected by the webmaster. For example, the webmaster can include all external references that contain a single keyword, regardless of other keywords present in the external references. Accordingly, the webmaster can be flexible in determining the grouping of external references and in the corresponding conversion rate of the group of external references.

In at least one implementation, the method can further include providing recommendations to the webmaster. In particular, a recommendation can be made to the webmaster that allows the webmaster to better utilize available marketing techniques. For example, a recommendation can be made to the webmaster regarding search engine optimization. If the Web Page ranks low in a keyword search where there are a high number of searches or a high rate of conversion, a recommendation can be made to focus marketing efforts on improving the ranking of the Web Page within that keyword search. A further recommendation can be made for the webmaster to more actively monitor references that are not currently being monitored. Additionally or alternatively, a recommendation can be made regarding which channels or signals need to be focused on for improved marketing. For example, a recommendation can be made about the number of backlinks to the Web Page and how the webmaster can increase the number of backlinks. In at least one implementation, a recommendation can be made regarding the Web Page's competitive landscape. For example, a competitor's Web Page can be monitored and the webmaster can be alerted when a competitor's keyword rank changes or the competitor's number of backlinks increases. Additionally or alternatively, a recommendation can be made regarding changes in the Web Pages external references. For example, an alert can be provided to the webmaster if a change occurs in a keyword ranking that leads to a high number of conversions on the Web Page.

Figure 4:
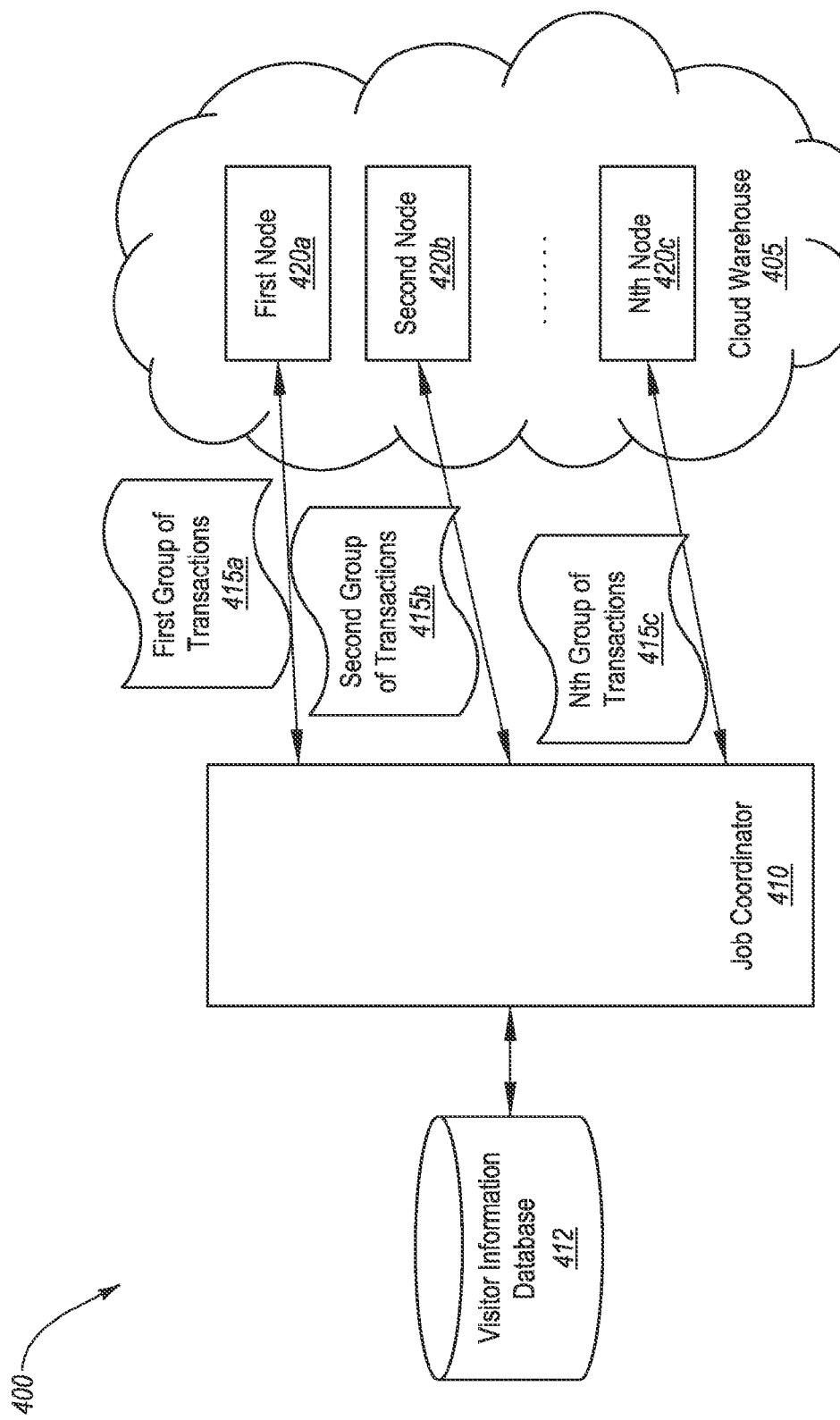
FIG. 4 illustrates a system for correlating conversions on a Web Page with an external reference using a cloud warehouse.

FIG. 4 illustrates a system 400 for correlating conversions on a Web Page with an external reference using a cloud warehouse 405 in accordance with some implementations. In at least one implementation, a cloud warehouse 405 can allow multiple implementations of software to run simultaneously, decreasing the time it takes to make the correlations. Additionally or alternatively, using a cloud warehouse 405 can reduce costs and speed results.

FIG. 4 shows that the system 400 can include a job coordinator 410. In at least one implementation, the job coordinator 410 receives information form an information database 412. The data in the information database 412 can be received from code embedded in the Web Page, from log files, from search headers or through some other method, as discussed above. In particular, the information database 412 can include data that is needed to correlate conversion on a Web Page with an external reference. For example, the data can identify conversions on the Web Page. Additionally or alternatively, the data can identify visitors to the Web Page. Additionally or alternatively, the data can include external references to the Web Page that directed a visitor to the Web Page.

In at least one implementation, the job coordinator 410 can assign all completed conversions to different groups 415a, 415b, 415c (collectively "groups 415") for processing. For example, the job coordinator 410 can divide conversions into groups 415 of a certain number of conversions. Additionally or alternatively, the job coordinator 410 can divide conversions into groups 415 based on the amount of information to be parsed. For example, if a high number of conversions need to be correlated, the job coordinator 410 can reduce the number of conversions in each group 415.

Additionally or alternatively, the job coordinator 410 can divide the conversions into groups 415 based on other criteria. For example, if multiple Web Pages are being analyzed simultaneously, the job coordinator 410 can divide the conversions into groups 415 based on the Web Page being analyzed. Additionally or alternatively, the job coordinator 410 can divide the conversions into groups 415 based on preferences set by the webmaster. For example, if the webmaster prefers lower cost, the job coordinator 410 can divide the conversions into a smaller number of groups 415 to decrease processing cost. Additionally or alternatively, if the web master prefers faster return time, the job coordinator 410 can divide the conversions into a larger number of groups 415 to decrease processing time.

In at least one implementation, the job coordinator 410 can include a computing environment. In particular, the job coordinator 410 can include a processor, an FPGA, memory, or any other hardware or software necessary for performing its intended function. For example, the job coordinator 410 can include a server which is configured to assign the conversions to groups 415 and present them to a cloud warehouse 405 for analysis.

FIG. 4 also shows that the job coordinator 410 can assign the different groups 415 of conversions to different nodes 420a, 420b, 420c (collectively "nodes 420") within a cloud warehouse 405 for processing. In at least one implementation, the job coordinator 410 can assign the different groups 415 to different nodes 420 based on preferences set by the webmaster. For example, if the webmaster prefers to keep costs low, the job coordinator 410 can assign the groups 415 to cheaper nodes 420 or can assign the groups 415 to nodes 420 during non-peak hours, when rates might be cheaper. Additionally or alternatively, if the webmaster prefers faster return time, the job coordinator 410 can assign the groups 415 to the fastest available to be analyzed immediately.

FIG. 4 further shows that the system includes a cloud warehouse 405. In at least one implementation, a cloud warehouse 405 includes one or more nodes 420. In particular, the one or more nodes 420 include a computing environment that is capable of executing software or other commands. The one or more nodes 420 can be leased as needed for use by someone other than the hardware owner.

In at least one implementation, the use of the nodes 420 can be pre-arranged. I.e., the time and manner of using the nodes 420 can be arranged ahead of time or according to a pre-arranged schedule. Additionally or alternatively, the nodes 420 can be made available on an "as needed" basis. For example, the cloud warehouse 405 can keep an updated list of available nodes. The cloud warehouse 405 can then communicate this information to the job coordinator 410, which then assigns the different groups 415 to available nodes 420. Additionally or alternatively, the cloud warehouse 405 can receive the groups 415 and assign the groups 415 to different nodes 420 as they become available.

Figure 5A:
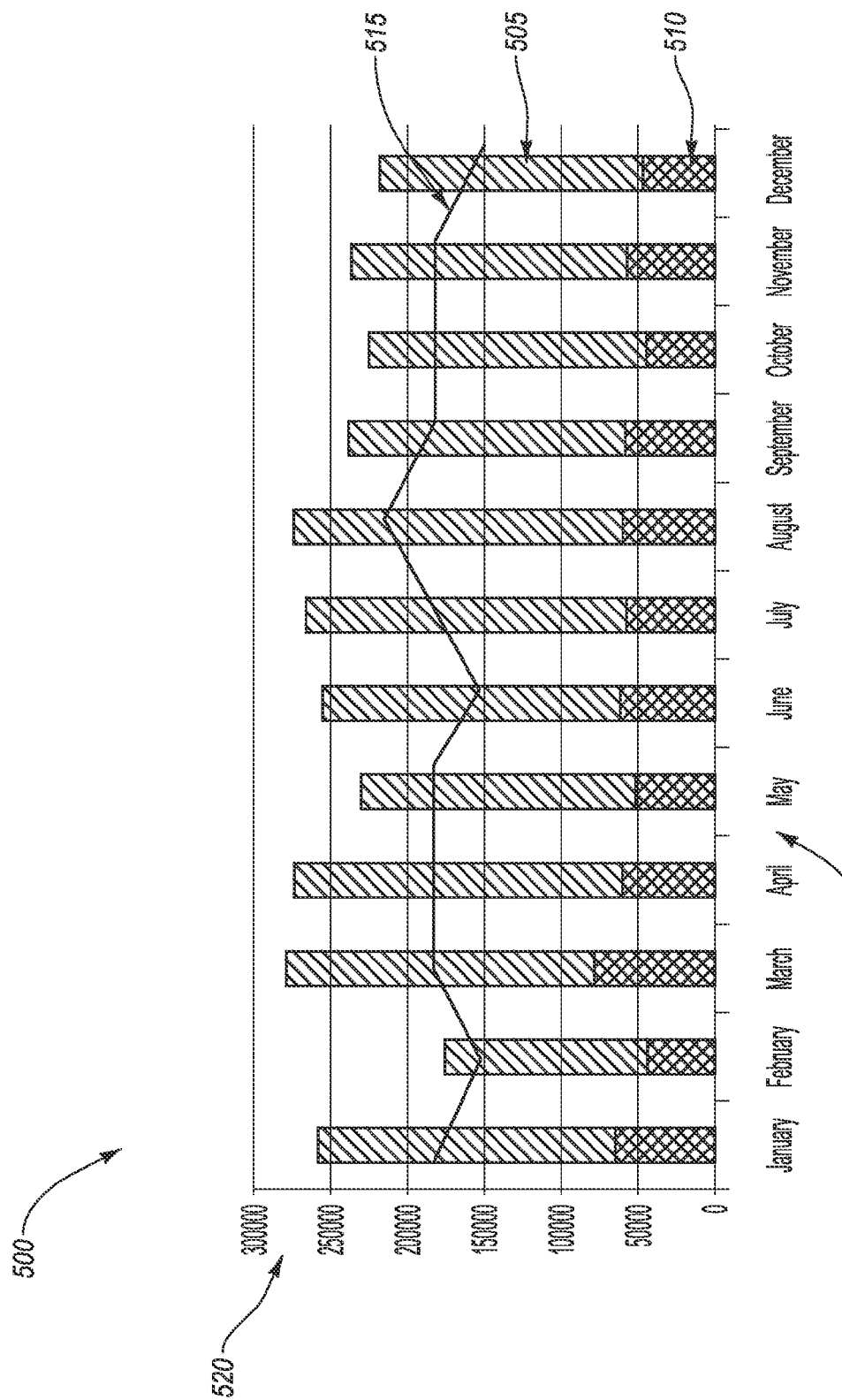
FIG. 5A illustrates an example of a chart for presenting correlation results to a webmaster.

FIG. 5A illustrates an example of a chart 500 for presenting correlation results to a webmaster in accordance with some embodiments. In at least one implementation, the chart 500 can allow the webmaster to determine the effectiveness of a particular marketing campaign. In particular, the chart 500 can be a bar graph, as shown in FIG. 5A. For example, the chart 500 can show how visits 505, conversions 510 and monetary value 515 of the conversions have changed over time. In particular, the chart 500 can include correlation results for a particular external reference. For example, the chart 500 can include the number of visitors 505, the number of conversions 510 and the monetary value 515 of the conversions as a result of a particular keyword search in a search engine.

In at least one implementation, the chart 500 can show the number of conversions 510 and the number of visitors 505 as integer values. Additionally or alternatively, the chart 500 can show the number of conversions 510 as a percentage of the number of visitors as a y-axis 520. Further, the chart 500 can include the monetary value 515 of the conversions 510. For example, the chart 500 can include the total monetary value 515 of all conversions 510. Additionally or alternatively, the chart 500 can include the average monetary value 515 of each conversion 510 or each visit 505. Accordingly, a webmaster can easily see how many visits 505 result in conversions 510 and how much monetary value 515 each visit 505 or conversion 510 brings.

In at least one implementation, a chart 500 can include time ranges as an x-axis 525. For example, the x-axis 525 can show time intervals of one month. Additionally or alternatively, the x-axis 525 can show time of day, day of the week, or years. In at least one implementation, the webmaster can change the values shown on the x-axis 525, as desired. Accordingly, a web master can easily evaluate how effective external references have been in creating conversions.

Figure 5B:
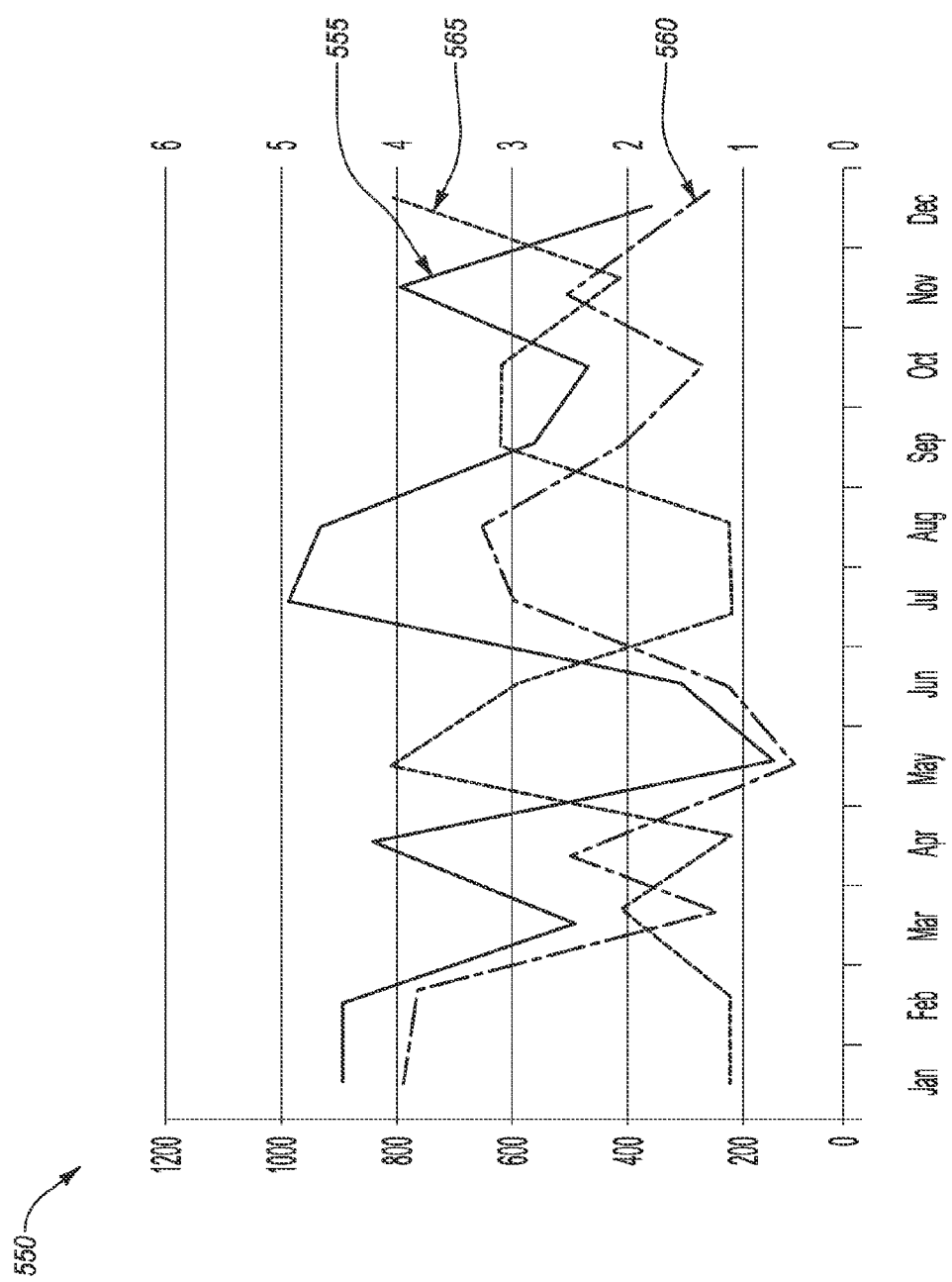
FIG. 5B illustrates an alternative example of a chart for presenting correlation results to a webmaster.

FIG. 5B illustrates an alternative example of a chart 550 for presenting correlation results to a webmaster in accordance with some embodiments. In at least one implementation, the chart 550 can allow the webmaster to determine the effectiveness of a particular marketing campaign. For example, the chart 550 can show rankings 565 in a keyword search have changed over time and how visits 555 and conversions 560 that result from the keyword search have changed with changes in the Web Pages ranking.

Figure 6A:
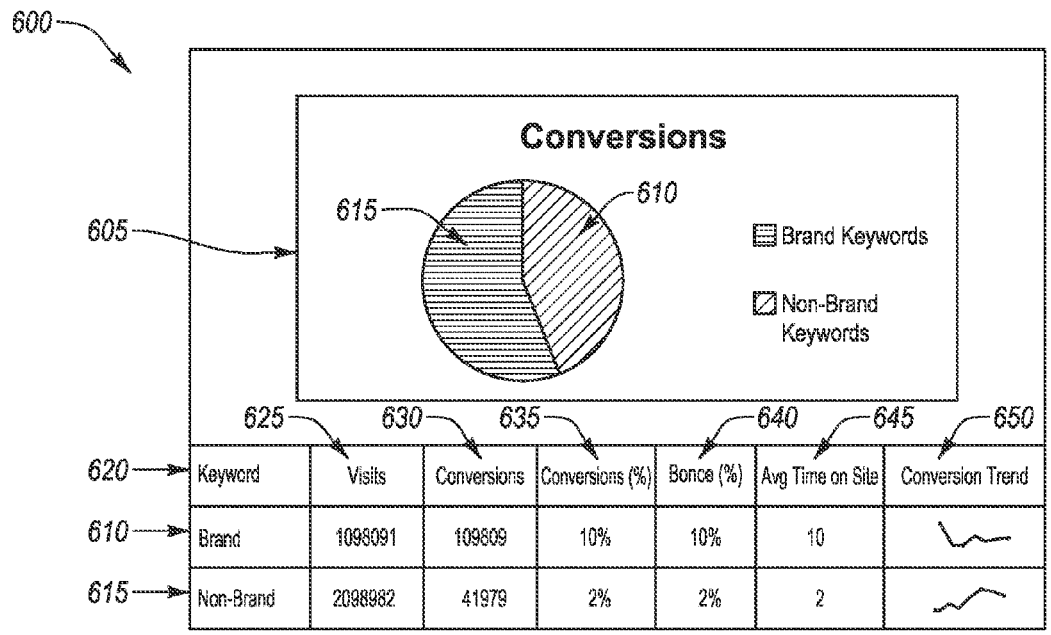
FIG. 6A illustrates an example of a display for presenting correlation results to a webmaster.
Figure 6B:
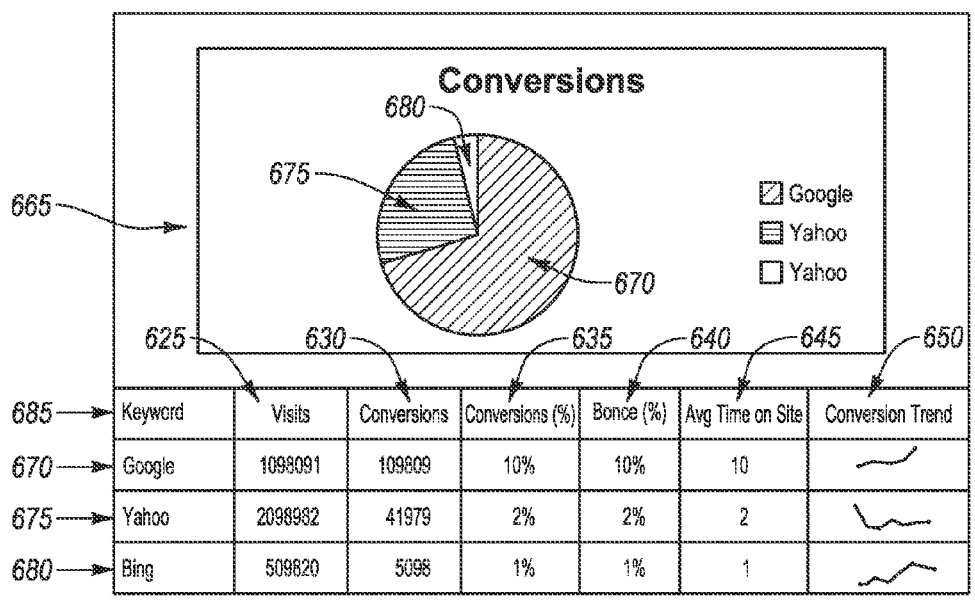
FIG. 6B illustrates an alternative example of a display for presenting correlation results to a webmaster.

FIGS. 6A and 6B illustrate examples of displays 600 and 660 for presenting correlation results to a user, in accordance with some embodiments. FIG. 6A illustrates a display 600 that includes a pie chart 605 which shows conversions that result from search results. In at least one implementation, a pie chart 605 can be used to illustrate percent of visits or conversions that result from a particular external reference or group of external references. For example, FIG. 6A shows a pie chart 605 which shows conversions that occur because of search engine results. The pie chart divides conversions into two categories. The first category is conversions which results from brand keywords 610. In at least one implementation, brand keywords 610 can include keywords that are specific to the Web Page. For example, brand keywords 610 can include company name, the name of specific products or trademarked names. The second category in FIG. 6A is conversions which result from non-brand keywords 615. In at least one implementation, non-brand keywords 615 include keywords that relate to the general area of the Web Page. For example, non-brand keywords 615 can include keywords that relate to the type of product sold or the type of business.

FIG. 6A also shows that the display 600 can include a table 620 that gives numerical information regarding visitors to the web-page separated by brand 610 and non-brand 615 keyword searches. In particular, the table 620 shows information regarding the number of visitors 625 as a result of both brand 610 and non-brand 615 keyword searches. Additionally, the table 620 shows the number of conversions as both an integer value 630 and as a percentage 635 of visitors 625. Further the table 620 shows the bounce rate 640 and the average time 645 on the site. In at least one implementation, bounce rate 640 includes the number of visitors 625 to the Web Page who leave without visiting any other pages within a website. FIG. 6A also shows that the table 620 includes the conversion trend 650. In at least one implementation, the conversion trend 650 can include the number of conversions 630 that result within a specific amount of time. Additionally or alternatively, the conversion trend 650 can include the conversion percentage 635 of visitors within a specified time range.

FIG. 6B illustrates a display 660 that includes a pie chart 665 which shows conversions that result from search results. In contrast to FIG. 6A, FIG. 6B shows the same analytic data except the categories have been modified to include search results as a function of the search engine used. For example, FIG. 6B shows analytics based on whether the visitor searched on Google 670, Yahoo 675 or Bing 680. In at least one implementation, a pie chart 665 can be used to illustrate percent of visits or conversions that result from a particular external reference or group of external references. For example, FIG. 6B shows a pie chart 665 which shows conversions that occur because of search engine results. The pie chart divides conversions into three categories. The first category is conversions which results from searches using Google 670. The second category in FIG. 6B is conversions which result from searches using Yahoo 675. The third category in FIG. 6B is conversions which result from searches using Bing 680.

FIG. 6B also shows that the display 660 can include a table 685 that gives numerical information regarding visitors to the web-page separated by searches in Google 670, Yahoo 675 and Bing 680. In particular, the table 685 shows information regarding the number of visitors 625 as a result of searches in Google 670, Yahoo 675 and Bing 680. Additionally, the table 685 shows the number of conversions as both an integer value 630 and as a percentage 635 of visitors 625. Further the table 685 shows the bounce rate 640 and the average time 645 on the site. In at least one implementation, bounce rate 640 includes the number of visitors 625 to the Web Page who leave without visiting any other pages within a website. FIG. 6B also shows that the table 685 includes the conversion trend 650. In at least one implementation, the conversion trend 650 can include the number of conversions 630 that result within a specific amount of time. Additionally or alternatively, the conversion trend 650 can include the conversion percentage 635 of visitors within a specified time range.

One of ordinary skill in the art will recognize that the displays 600 and 660 can include any relevant web analytics whether obtained through the methods described above or in some other manner. One of ordinary skill in the art will further recognize that the displays 600 and 660 can be broken down into different categories without restriction and that the categories of external references and the analytics are illustrative only and not restrictive.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for estimating the value of an organic marketing campaign, the method comprising:
receiving an identification of one or more entry pages associated with a website;
receiving one or more keywords related to the entry pages;
by a computing device, determining conversion data, wherein the conversion data is based on traffic information identifying visits to at least one of the entry pages, wherein the visits comprise organic referrals from a search engine, wherein the conversion data quantifies a plurality of conversions completed on the website as a result of the visits, and wherein each of the conversions comprises a predetermined desired action to be completed on the website;
by the computing device, retrieving, using the keywords, organic search results from the search engine;
by the computing device, analyzing the organic search results to determine rank positions of the entry pages; and
by the computing device, identifying a correlation between the rank positions of the entry pages, the conversion data, and the keywords, wherein the identifying comprises determining, for a particular entry page, that a change in the rank position of the particular entry page or a change in the keywords related to the particular entry page correlates with an increase in conversions completed on the website based on visits to the particular entry page.

2. The method of claim 1, wherein the conversions comprise: a purchase made on the website, content posted on the website, or information submitted using a form on the website.

3. The method of claim 1, wherein the conversions comprise: following a link on the website, selecting content on the website, or contacting a third party using contact information displayed on the website.

4. The method of claim 1, wherein the conversion data was provided by a third party system.

5. The method of claim 1, wherein the traffic information is provided by a third party system.

6. The method of claim 5, wherein the determining conversion data comprises computing the conversion data using the traffic information provided by the third party system.

7. The method of claim 1, wherein the identifying the correlation comprises determining, based on the traffic information, an amount of traffic to the entry pages or a number of web pages of the website that were loaded.

8. The method of claim 1, wherein the analyzing the organic search results to determine rank positions of the entry pages comprises:
 determining that at least one of the entry pages is listed in the organic search results; and
 determining where the at least one of the entry pages appears in the organic search results.

9. The method of claim 1, further comprising:
 determining, based on the correlation, a monetary value of the conversions, wherein the monetary value comprises a total monetary value of the conversions, an average monetary value of the conversions, or a monetary value for each of the conversions.

10. The method of claim 9, wherein the monetary value of the conversions is determined as a result of a particular keyword search in a search engine.

11. The method of claim 1, further comprising:
 determining, based on the correlation, a conversion trend, wherein the conversion trend is based on a number of the conversions over a specified time range.

12. The method of claim 1, further comprising:
 determining, based on the correlation, a bounce rate, wherein the bounce rate is based on a number of the visits to at least one of the entry pages that do not result in any visits to other pages associated with the website.

13. One or more computer-readable non-transitory storage media embodying software comprising instructions operable when executed to:
 receive an identification of one or more entry pages associated with a website;
 receive one or more keywords related to the entry pages;
 determine conversion data, wherein the conversion data quantifies a plurality of conversions completed on the website as a result of visits to at least one of the entry pages, wherein the visits comprise organic referrals from a search engine, wherein the conversion data quantifies a plurality of conversions completed on the website as a result of the visits, and wherein each of the conversions comprises a predetermined desired action to be completed on the website;
 retrieve, using the keywords, organic search results from the search engine;
 analyze the organic search results to determine rank positions of the entry pages; and
 identify a correlation between the rank positions of the entry pages, the conversion data, and the keywords, wherein the identifying comprises determining, for a particular entry page, that a change in the rank position of the particular entry page or a change in the keywords related to the particular entry page correlates with an increase in conversions completed on the website based on visits to the particular entry page.

14. The media of claim 13, wherein the monetary value of each of the conversions is determined as a result of a particular keyword search in a search engine.

15. The media of claim 13, further comprising:
 determining, based on the correlation, a conversion trend, wherein the conversion trend is based on a number of the conversions over a specified time range.

16. The media of claim 13, further comprising:
 determining, based on the correlation, a bounce rate, wherein the bounce rate is based on a number of the visits to at least one of the entry pages that do not result in any visits to other pages associated with the website.

17. A system comprising:
 one or more processors; and
 a memory coupled to the processors comprising instructions executable by the processors, the processors being operable when executing the instructions to:
 receive an identification of one or more entry pages associated with a website;
 receive one or more keywords related to the entry pages;
 determine conversion data, wherein the conversion data is based on traffic information identifying visits to at least one of the entry pages, wherein the visits comprise organic referrals from a search engine, wherein the conversion data quantifies a plurality of conversions completed on the website as a result of the visits, and wherein each of the conversions comprises a predetermined desired action to be completed on the website;
 retrieve, using the keywords, organic search results from the search engine;
 analyze the organic search results to determine rank positions of the entry pages; and
 identify a correlation between the rank positions of the entry pages, the conversion data, and the keywords, wherein the identifying comprises determining, for a particular entry page, that a change in the rank position of the particular entry page or a change in the keywords related to the particular entry page correlates with an increase in conversions completed on the website based on visits to the particular entry page.

18. The system of claim 17, wherein the conversion data was provided by a third party system.

19. The system of claim 17, wherein the traffic information is provided by a third-party system.

20. The system of claim 19, wherein the determining conversion data comprises computing the conversion data using the traffic information provided by the third-party system.

* * * * *